United States Patent [19]

Barclay, Jr.

[11] Patent Number: 5,862,401
[45] Date of Patent: Jan. 19, 1999

[54] PROGRAMMABLE CENTRAL INTELLIGENCE CONTROLLER AND DISTRIBUTED INTELLIGENCE NETWORK FOR ANALOG/DIGITAL CONTROL SYSTEMS

[75] Inventor: Clayton C. Barclay, Jr., Elkhart, Ind.

[73] Assignee: Crown International, Inc., Elkhart, Ind.

[21] Appl. No.: 883,869

[22] Filed: Jun. 27, 1997

Related U.S. Application Data

[63] Continuation of Ser. No. 321,208, Oct. 11, 1994, abandoned.

[51] Int. Cl.$^6$ .............................. G06F 13/00; G05B 13/00
[52] U.S. Cl. ......................... 395/821; 364/133; 364/134
[58] Field of Search ................................... 395/821, 822, 395/882

[56] References Cited

U.S. PATENT DOCUMENTS

| | | | |
|---|---|---|---|
| 4,303,990 | 12/1981 | Seipp ........................................ | 395/740 |
| 4,330,809 | 5/1982 | Stanley ...................................... | 361/103 |
| 4,477,882 | 10/1984 | Schumacher et al. ............. | 395/200.21 |
| 4,504,927 | 3/1985 | Callan ....................................... | 395/822 |
| 4,528,623 | 7/1985 | Tachibana ................................ | 364/191 |
| 4,542,452 | 9/1985 | Fukai et al. .............................. | 364/141 |
| 4,644,288 | 2/1987 | Stanley ........................................ | 330/2 |
| 4,736,340 | 4/1988 | Desserrieress et al. ................. | 395/155 |
| 4,737,735 | 4/1988 | Kampes ..................................... | 330/297 |
| 4,858,101 | 8/1989 | Stewart et al. ........................... | 364/131 |
| 5,015,969 | 5/1991 | Barclay et al. ........................... | 330/284 |
| 5,136,222 | 8/1992 | Yamamoto et al. ................... | 318/568.2 |
| 5,159,673 | 10/1992 | Sackmann et al. ................. | 395/200.16 |
| 5,261,114 | 11/1993 | Raasch et al. ...................... | 395/200.51 |
| 5,309,517 | 5/1994 | Barclay ...................................... | 381/119 |
| 5,371,860 | 12/1994 | Mura et al. .............................. | 395/842 |
| 5,390,103 | 2/1995 | Sakakibara .............................. | 364/131 |
| 5,402,499 | 3/1995 | Robison et al. ......................... | 381/119 |
| 5,408,624 | 4/1995 | Raasch et al. ........................... | 395/375 |
| 5,504,930 | 4/1996 | Kobayashi et al. ...................... | 395/800 |
| 5,530,588 | 6/1996 | Amasaki et al. ........................ | 395/825 |
| 5,530,888 | 6/1996 | Amasaki et al. ........................ | 395/825 |
| 5,586,335 | 12/1996 | Utan ......................................... | 364/147 |
| 5,586,337 | 12/1996 | Kusakabe ................................ | 395/800 |

OTHER PUBLICATIONS

Crown Advertisement on "Signs of Artificial Intelligent Life"
Crown Advertisement on "Smart Amp", dated 1993.
Crown Brochure, "IQ System 2000" dated 1988.

Primary Examiner—Meng-Ai T. An
Assistant Examiner—Sumati Lefkowitz
Attorney, Agent, or Firm—Baker & Daniels

[57] ABSTRACT

The present invention involves a programmable microprocessor based controller having the capacity to store multiple operational instruction sets for independently controlling system components. The invention further involves a distributed intelligence network of such programmable controllers having the capability to interface with one another, Host computers, and system control components to provide system-wide automation for simultaneously monitoring and controlling video, audio, and electro-mechanically operated equipment. The programmable controller accepts analog and digital inputs and provides a wide range of user defined control functionality through its analog and digital outputs and its many external connections. The controller can support one and possibly two communication buses, depending upon the application, upon which a plurality of system components may be connected to each. Automatic control system applications include, but are not limited to: concert sound systems, stadium sound systems, theme park automation, video-conferencing, etc. The invention further involves firmware for implementing smooth output limiting, automatic standby, short detection, enhanced ODEP conservation, and interrupt driven reporting.

21 Claims, 13 Drawing Sheets

```
======================= Drone Aux Input Setup =======================

Input   | Simplex/Binary |  Direct/Dataframe
 --------|----------------|-------------------
   1     |   Binary       |   Direct
   2     |   Binary       |   Direct
   3     |   Binary       |   Direct
   4     |   Binary       |   Direct
   5     |   Binary       |   Direct
   6     |   Binary       |   Direct
   7     |   Strobe       |   Direct
   8     |   Simplex      |   Direct
   9     |   Simplex      |   Direct
  10     |   Simplex      |   Direct
  11     |   Simplex      |   Direct
  12     |   Simplex      |   Direct
  13     |   Simplex      |   Direct
  14     |   Simplex      |   Direct
  15     |   Simplex      |   Direct
  16     |   Simplex      |   Direct Channel A   1-7                           Channel C
 Channel B                                 Channel D =========== [Esc] [PgUp] Return  [PgDn] Next Page ===========
```

FIG. 9A

```
Paralyze Commands

Add

Input 1 Paralyzes Aux Input 12                      Modify

Input #2 paralyzes Input #5    <o> Aux              Copy
                               < > Analog
                                                    Delete
                    When Unparalyzed:
                       < > Send No Settings
                       <o> Send Current Settings
                       < > Send On Settings
                       < > Send Off Settings When Paralyzed:
  < > Send No Settings
  < > Send Current Settings
  < > Send On Settings
  <o> Send Off Settings Cancel
        OK

[Tab] [Sh-Tab] [Esc]
```

FiG. 9B

[Tab][Sh-Tab] Next/Prev Item [PgUp][PgDn] Next/Prev Page

FIG. 9C

Aux Input Commands

Add
Modify
Copy
Delete

Input #12

Components Online
Zone 1 Amplifier 1
Zone 1 Amplifier 2
Zone 1 SMX-6 1

Available Functions
Max Gain Ch 2 In 3
Max Gain Ch 2 In 4
Max Gain Ch 2 In 5
Max Gain Ch 2 In 6
Low Set Ch 1 In 1
Low Set Ch 1 In 2

[x] Momentary   On Level (dB)   04
[ ] Inverted    Off Level (dB)  -10

OK   Cancel

[Tab] [Sh-Tab] [Esc]

[Tab][Sh-Tab] Next/Prev Item [PgUp][PgDn] Next/Prev Page

```
┌─────────────────────────────────────────────────────────────────────┐
│ ══Analog Input Commands══                                           │
│                                                                     │
│   ┌─────────┐                                    ┌─────────┐        │
│   │   Add   │                                    │         │        │
│   └─────────┘                                    └─────────┘        │
│   ┌─────────┐                                                       │
│   │ Modify  │                                                       │
│   └─────────┘                                                       │
│   ┌─────────┐                                                       │
│   │  Copy   │                                                       │
│   └─────────┘                                                       │
│   ┌─────────┐                                                       │
│   │ Delete  │                                                       │
│   └─────────┘                                                       │
│                                                                     │
│  ┌───────────────────────────────────────────────────────────────┐  │
│  │ Input #16                                                     │  │
│  │                                                               │  │
│  │ Components Online                                             │  │
│  │ Zone 1 Amplifier 1                                            │  │
│  │ Zone 1 Amplifier 2                                            │  │
│  │ Zone 1 SMX-6 1                                                │  │
│  │                                                               │  │
│  │ Available Functions                                           │  │
│  │ Attenuation Ch 1                                              │  │
│  │ Attenuation Ch 2                                              │  │
│  │                                                               │  │
│  │                          Max Level (dB)   -10                 │  │
│  │                          Min Level (dB)   -35                 │  │
│  │                                                               │  │
│  │                           ┌────┐  ┌────────┐                  │  │
│  │                           │ OK │  │ Cancel │                  │  │
│  │                           └────┘  └────────┘                  │  │
│  │              [Tab] [Sh-Tab] [Esc]                             │  │
│  └───────────────────────────────────────────────────────────────┘  │
│ ══[Tab][Sh-Tab] Next/Prev Item [PgUp][PgDn] Next/Prev Page══        │
└─────────────────────────────────────────────────────────────────────┘
```

FIG. 9O

PROGRAMMABLE CENTRAL INTELLIGENCE CONTROLLER AND DISTRIBUTED INTELLIGENCE NETWORK FOR ANALOG/DIGITAL CONTROL SYSTEMS

This is a continuation of application Ser. No. 08/321,208, filed Oct. 11, 1994, now abandoned.

BACKGROUND OF THE INVENTION

The field of the invention relates generally to automated systems for simultaneously monitoring and controlling video, audio, and electro-mechanically operated equipment and more specifically to audio amplifier control systems. Automatic control system applications include, but are not limited to: concert sound systems, stadium sound systems, theme park automation, video-conferencing, etc. Certain automation systems utilize control components interfaced with Host computers to accomplish their tasks. In the absence of a Host computer, some limited stand-alone operation may be provided, such as local amplifier control, Junction Temperature Simulation (JTS), and Output Device Emulator Protection (ODEP) conservation.

Such systems are extremely dependent upon their associated Host computer for effective operation. In the event such a Host computer is off-line, the entire control system is compromised and many essential functions are disabled. In addition, many systems are too small to justify having a Host computer much less a qualified technician to operate it.

For real time operation it is essential that an automated control system operate on a high speed communication path. With large systems having thousands of components all having their individual data processed through a single source, i.e. Host computer, the overall system operating speed is reduced. Thus, the nature and the extent of control of these systems limit their applicability to real time operation.

SUMMARY OF THE INVENTION

The invention relates generally to microprocessor based controllers and specifically to a distributed intelligence network of controllers having the capability to interface with one another and with system control components to provide system wide automation. The controller, referred to hereafter as the "Drone," includes a general purpose programmable controller for monitoring and controlling digital, analog, and audio signals. The Drone's two microprocessors and dual-access RAM configuration allows for a wide range of user defined control functionality through its many external connections.

The Drone has the ability to communicate directly to a Host computer via a serial port or it can communicate with a Host computer through an interface unit. The Drone is also capable of operating multiple devices on a common bus. With the Drone connected directly to a Host computer, in one embodiment it can support two communication buses ("bus loop") upon which a multiplicity of system components may be connected to each. For larger systems, multiple Drones may be interfaced to one another with one of the two bus loops, thereby leaving each Drone a bus loop upon which multiple system components may be connected. For systems having a Host computer connected to an interface unit capable of supporting multiple bus loops, Drones may be given an address and connected to any of the bus loops via one of its two bus loop connections. Each Drone may then support multiple system components with its remaining bus loop.

The design allows an operator using a Host computer to program the Drone how to control a system, then to remove the Host computer from the system, it being unnecessary for subsequent Drone operation. Rather than using a desk top Host computer, a user may interface with a Drone using a laptop/notebook computer, thereby allowing easier access to remotely located Drones. The Host computer provides the operating system by which an operator may program the Drone. The Drone is programmed by using graphic objects, or it can be programmed from Drone control block and sub-block screens. The Drone control block allows an operator to control and monitor input and output ports, label the Drone, and control Auto System Algos (ASA). An operator programs the Drone by setting variable modes of the chosen object, i.e., by setting attenuation ranges, ODEP conservation levels, smooth output limiting (SOL) threshold levels, etc. These sub-blocks create the dataframe "intelligence" of the Drone whereby variable operating modes are defined.

The Drone consists of a plurality of analog inputs, analog outputs, digital (auxiliary) inputs, and digital outputs. Four of the analog inputs are balanced, whereby 16 volt phantom power is available to power condenser microphones. Each of these balanced inputs are AC-coupled to a corresponding output. Peak detectors are provided for direct connection to the Drone.

There are several advantages associated with the Drone invention. One relates to the capability to tie multiple Drones together in a distributed intelligence network, where the Drone controllers can be interfaced to one another and to respective system control components for system wide automation. Another advantage of the Drone is its ability to function in a stand-alone mode for monitoring and controlling digital, analog, and audio signals.

Accordingly, it is an object of this invention to provide a controller having novel firmware capable of supporting stand-alone operation.

Another object of the invention is to provide a system controller novel configuration of microprocessors, memory, converters, power supplies, and other related components to allow downloading and storing dataframes, thereby providing a stand-alone controller.

Another object of the invention is to provide a controller having a novel configuration of microprocessors, memory, converters, power supplies, and other related components to accept balanced analog inputs, such as a microphone, as well as 0–10 volt referenced analog input signals, and digital (auxiliary) inputs and outputs for greater overall flexibility in controlling system components.

Another object of the invention is to provide a controller having novel configuration of microprocessors, memory, converters, power supplies, and other related components to interface individually or jointly either directly with a system computer or with a system computer through an interface device so as to monitor and control system-wide components.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 9A is a screen print of the Drone digital input sub-block used in programming dataframes for downloading to the Drone.

FIG. 9B is a screen print of the Paralyze Command sub-block used in programming dataframes for downloading to the Drone.

FIG. 9C is a screen print of the Drone digital input command sub-block used in programming dataframes for downloading to the Drone.

FIG. 9D is a screen print of the Drone analog input command sub-block used in programming dataframes for downloading to the Drone.

Corresponding reference characters indicate corresponding parts throughout the several views. The exemplification set out herein illustrates one preferred embodiment of the invention, in one form, and such exemplifications are not to be construed as limiting the scope of the invention in any manner.

DETAILED DESCRIPTION OF THE INVENTION

The preferred embodiments disclosed below are not intended to be exhaustive or limit the invention to the precise forms disclosed in the following detailed description. Rather, the embodiments are chosen and described so that others skilled in the art may utilize their teachings.

Figure 1:
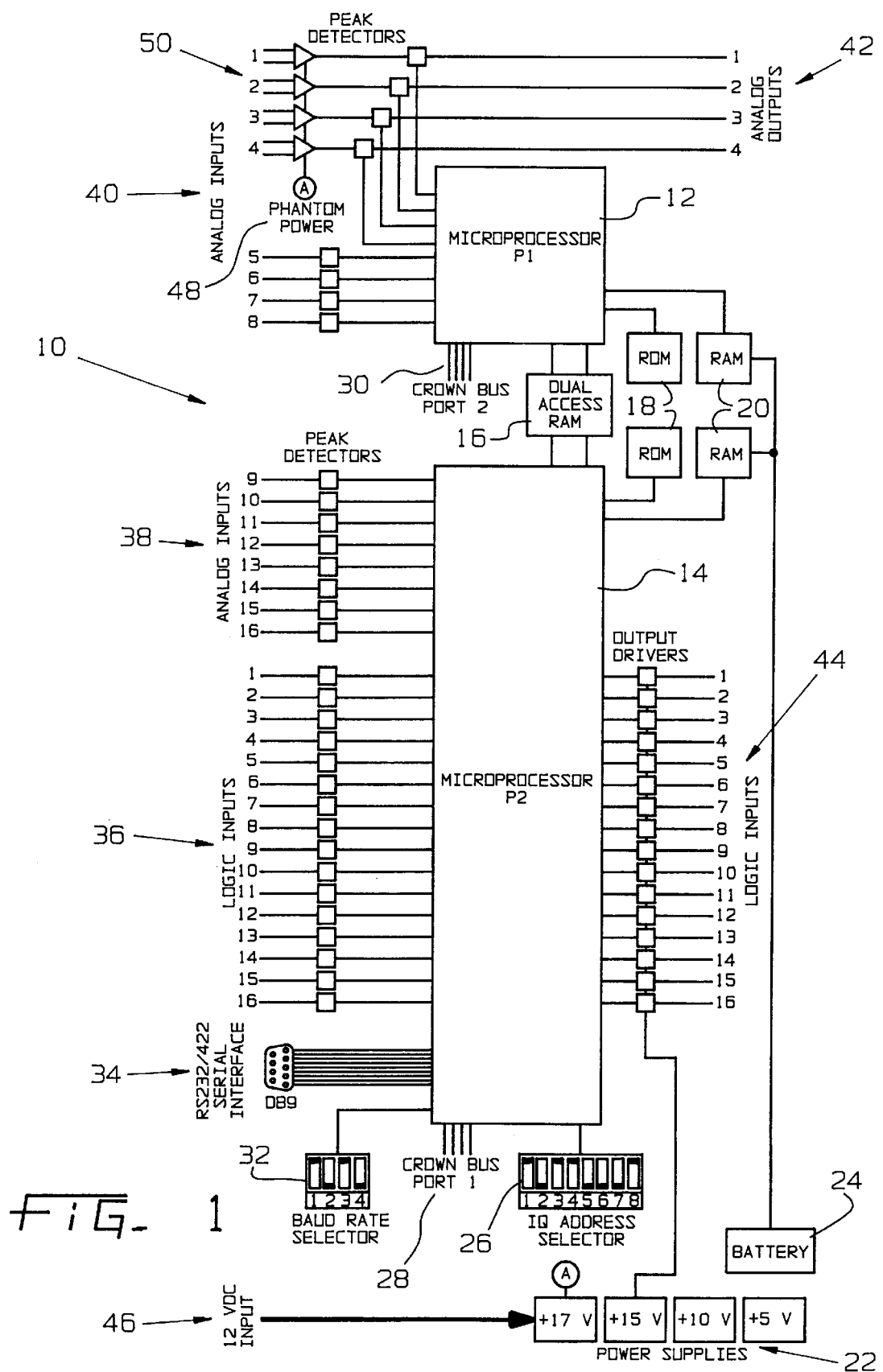
FIG. 1 is a block diagram of the Drone controller circuit.
Figure 2:
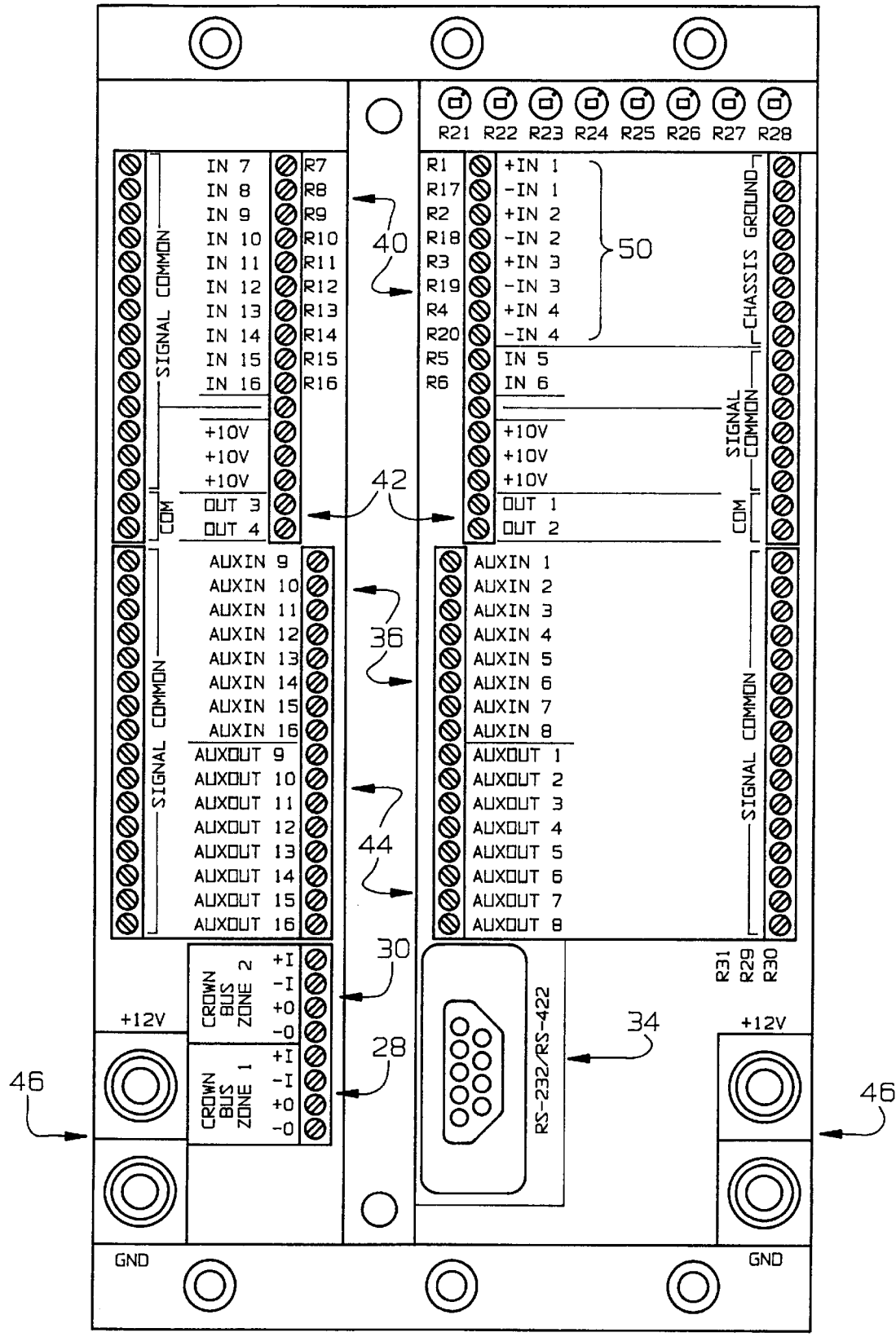
FIG. 2 is a diagram of the Drone termination board layout.

FIG. 1 is a block diagram illustrating a microprocessor based controller operable as either a stand-alone unit or in combination with multiple controllers (not shown) to form a distributed intelligence network for system wide automation. In this preferred embodiment, the controller, referred to hereinafter as the "Drone," includes a general purpose programmable controller for monitoring and controlling digital, analog, and audio signals. The Drone's two microprocessors and dual-access RAM configuration allows for a wide range of user defined control functionality through its many external connections. The Drone circuit 10 includes two microprocessors 12, 14, dual-access RAM 16, ROM chips 18, RAM chips 20, power supplies 22, battery 24, eight bit DIP switch 26, baud rate selector 32, and RS 232/422 serial interface 34. There are sixteen logic (digital) inputs 36, sixteen logic outputs 44, sixteen analog inputs 38, 40 (four of which are balanced analog inputs 50), and four analog outputs 42 associated with the Drone. For communication there are bus ports 1 and 2, 28, 30 for connection to other system components, preferably by a bus arrangement such as the Crown IQ 2000 system bus, and RS232/422 serial interface DB9 port 34 for direct communication with a computer. FIG. 2 is representative of the Drone termination board layout associated with the above described inputs, outputs and connections.

Figure 3:
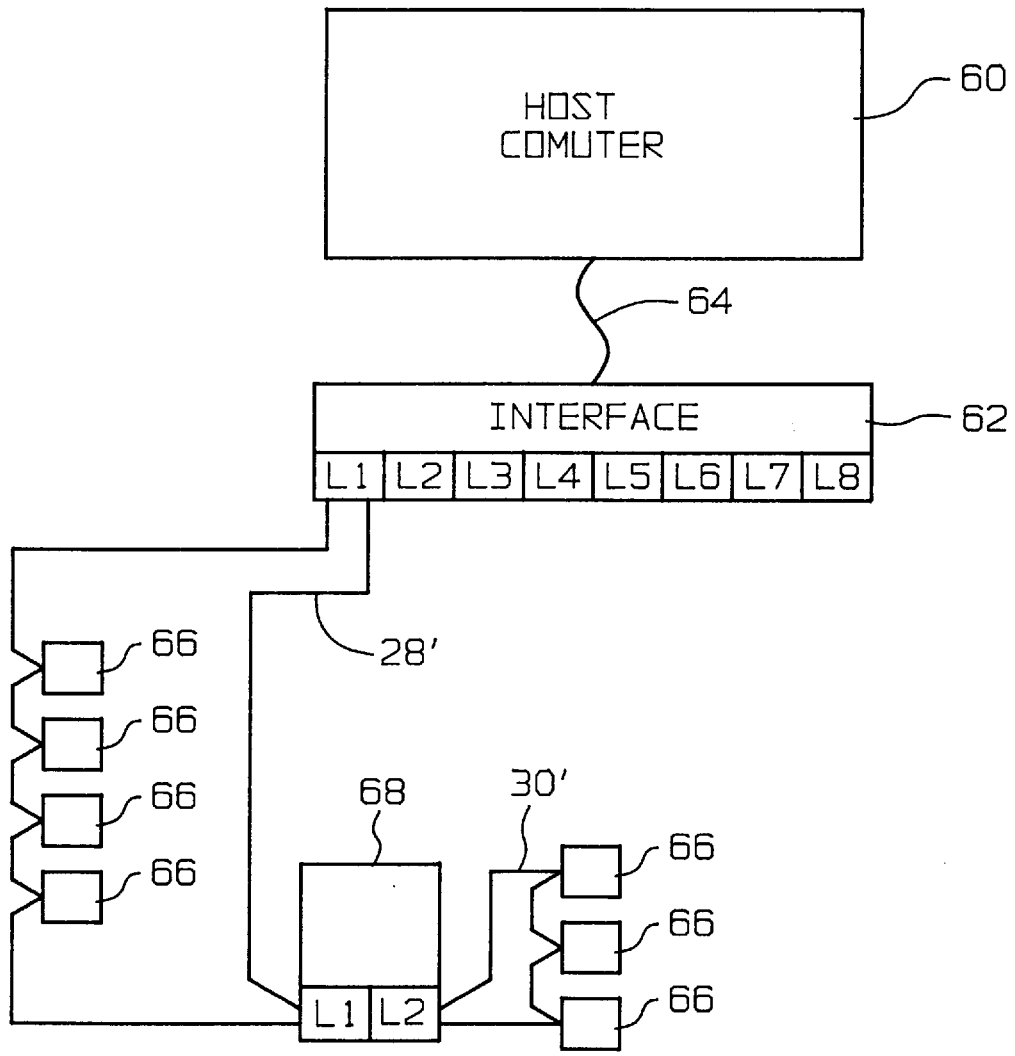
FIG. 3 is a block diagram of the Drone interfaced to a Host computer via a Crown INT interface unit.
Figure 4:
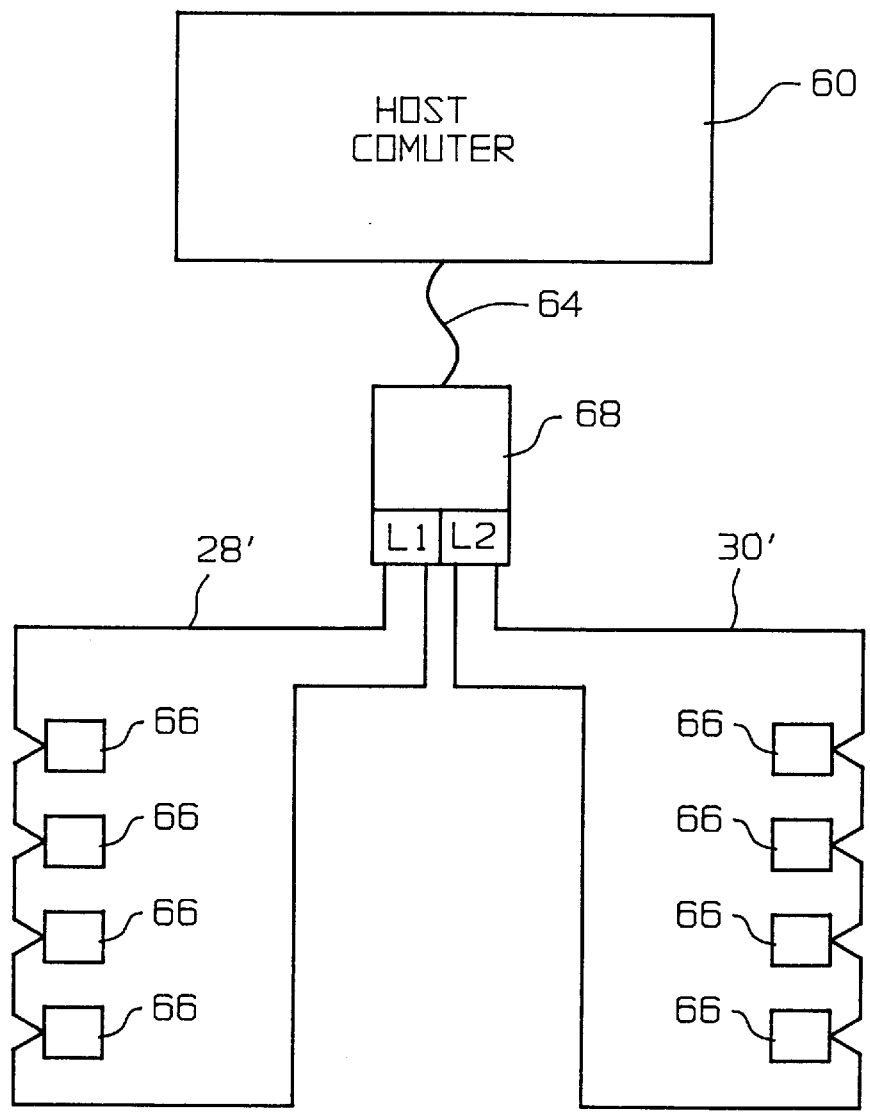
FIG. 4 is a block diagram of the Drone interfaced directly to a Host computer.
Figure 5:
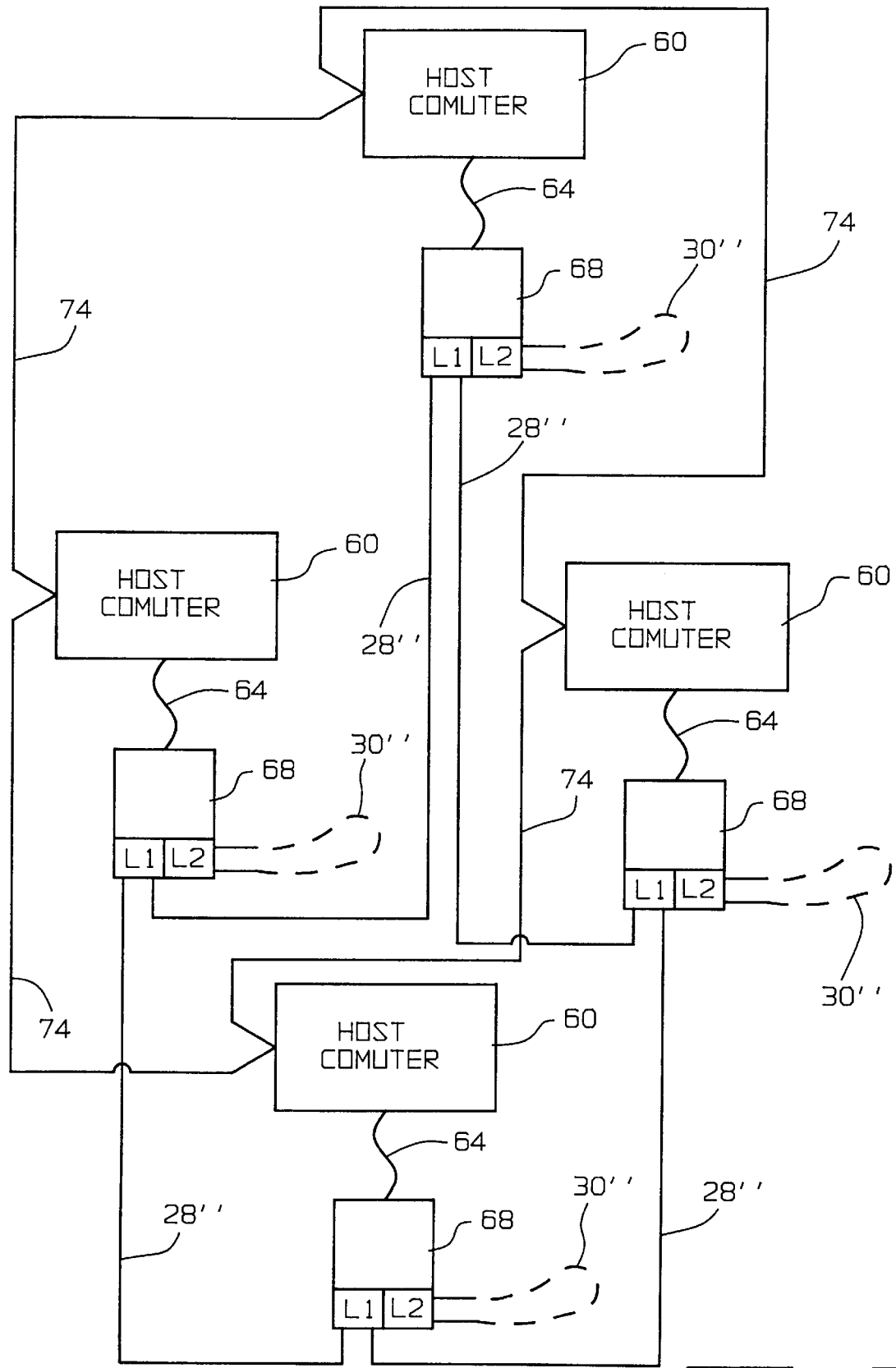
FIG. 5 is a block diagram of a plurality of Drones in the transponder mode interfaced to one another along a communication bus and to Host computers via serial lines.

The Drone may be utilized within an integrated control system in numerous configurations. Within the framework of the Crown IQ System, the Drone can function as an individual IQ component or it can function as a two-zone IQ interface. FIG. 3 and 4 show the Drone in the interface mode where the Drone operates as a normal system component on a bus zone loop or as a system interface. In the interface mode, the Drone functions as a system component and is given an address associated with its placement on the bus zone loop. The Host computer polls all components on each system loop according to their individual addresses and sends and receives information to and from the components. FIG. 5 shows the Drone in transponder mode which allows network operation.

FIG. 3 discloses a Drone connected to interface device 62, preferably a Crown INT, via communication bus 28' (typically operating at a speed of 38.6 KBaud) which is terminated at the Drone's Crown bus zone 1 termination 28 (FIG. 2) and at the Crown bus zone 1 termination of the Crown INT. This is also referred to as Loop 1 of the Drone. Loop 2 is represented by communication bus 30' and begins and ends at Crown bus zone 2 termination 30 of Drone 68. Attached to Drone 68 Loops 1, 28', and 2, 30', is a respective plurality of system components 66. Interface device 62 is connected to a Host computer 60 via RS 232/422 communication line 64. This configuration allows Drone 68 to communicate with Host computer 60 through interface 62. Should the Host computer be taken off-line or become inoperable, system components 66 on bus zone loop 28' will function in a diminished capacity depending upon the level of stand-alone capability each has. Drone 68 will continue to function in a fully automated manner in accordance with the dataframes, to be discussed further herein, currently residing in its memory, and will continue to provide supervision for system components 66 on bus zone loop 30'.

FIG. 4 shows Drone 68 in direct communication with Host Computer 60 via RS 232/422 line 64, this allows high speed communications between the two computers. System components 66 are integrated into the distributed intelligence network through their connection to the Drone bus zone loops 28', 30'. Once an operator sets up Drone 68 by downloading a single or a plurality of dataframes the Drone may be disconnected from the Host computer for stand-alone operation. Should either bus zone loop 28' or 30' become severed, the operating system will determine at which addresses the communication bus is disconnected and will issue a report at the Host computer.

FIG. 5 represents a Drone network including a plurality of Drones 68 in transponder mode where each is interconnected to the other via bus zone loop 28" and each is directly connected to their respective Host computer 60 by RS 232/422 line 64. Host computers 60 are interconnected by high speed local area network 74 which is capable of operating at communication speeds of 100 MBaud. From any one Host computer station an operator may access the respective local system or other systems networked on the other Drones. In order to operate in a Drone network, each Drone must be programmed to operate in transponder mode.

Each Drone 68 has a second bus zone loop 30" available for integrating a respective plurality of system components.

Initial set up is achieved by directly connecting a Host computer to the Drone's RS 232/422 DB9 serial port. By utilizing computer operating system Turbo 1.2 or higher, the Drone may be programmed using graphic objects on a Turbo plate, or it may be programmed from the Drone sub-block screens. The Drone control block allows the operator to control and monitor input and output ports, label the Drone, and control Auto System Algos (ASA).

Figure 8:
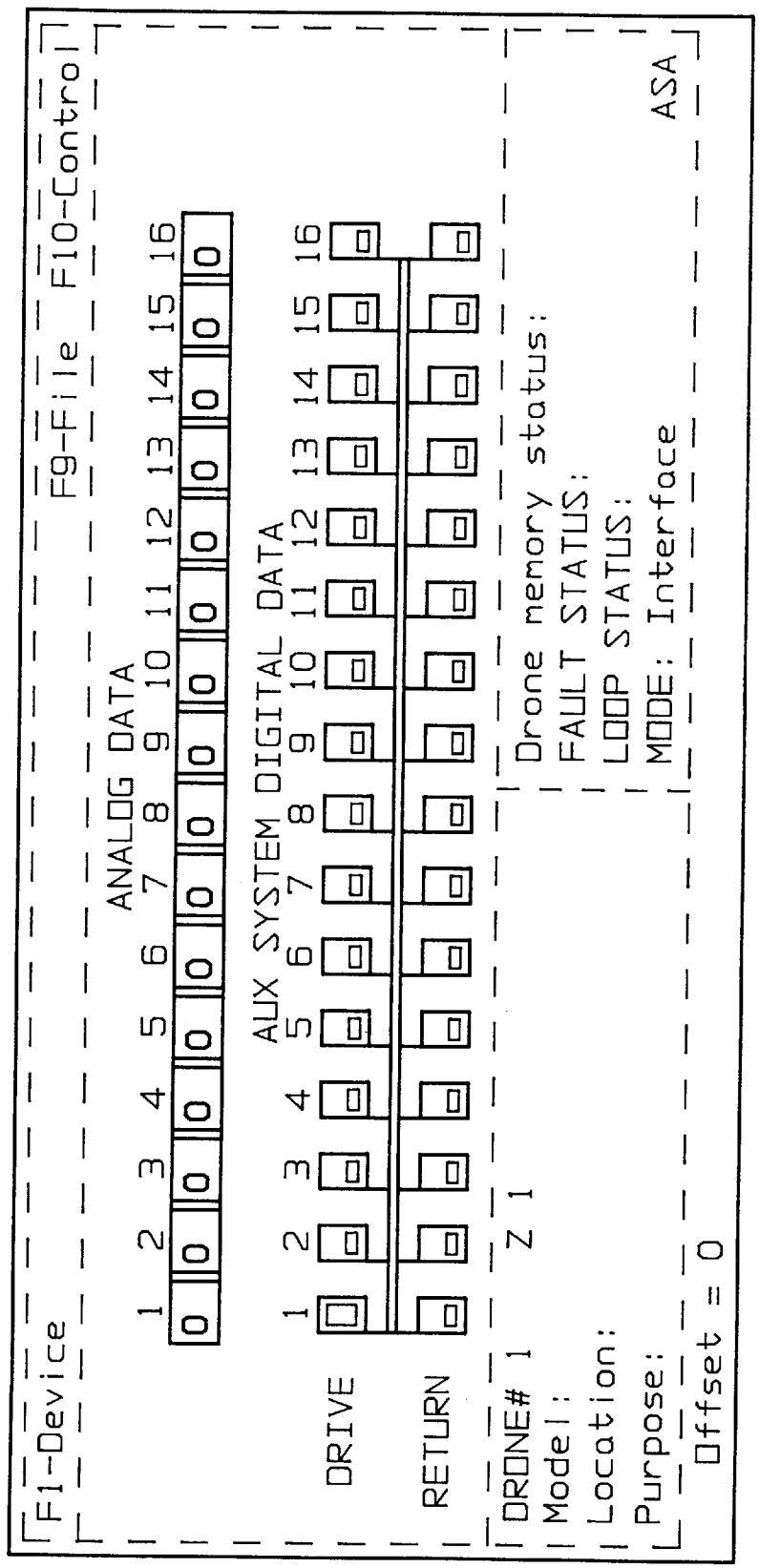
FIG. 8 is a screen print of a typical Drone control block associated with programming and monitoring.

FIG. 8 shows the Drone control block as it would appear on a monitor screen to an operator. The top row provides the operator with information about the analog levels introduced at the analog inputs. The levels representing each respective 0 to 10 volt analog input ranges from 0 to 255. The second row is the digital output control row, where a small block indicates a logical low and a taller block indicates a logical high. The third row indicates the logical condition of the digital inputs in the same manner as described for the digital outputs.

In the lower left corner of the Drone control block screen status information is found, such as, IQ system address, general information about the unit, memory fault indication and loop status. The operator can select either interface or transponder mode from this screen. In the lower right corner is the ASA enabler, the operator can enable ASA control for automatic control or disable ASA for Host directed control. When disabled, external commands sent to the Drone's digital or analog inputs will have no effect. ASA must be enabled to control the system using such Drone inputs.

FIG. 9A is shows the first sub-block screen which is associated with programming the Drone's sixteen digital (auxiliary) inputs. Each digital input may be defined in either of two modes, simplex or binary. In simplex mode the respective digital input is associated with one group of logical (two state) commands. The commands are programmed either with graphic objects on a graphic plate, or in other sub-block screens. In binary mode, several digital inputs may be grouped together to form binary input channels. A strobe must be assignable to each channel. The minimum number of inputs used for a binary input channel is three bits plus a strobe, accordingly, a single Drone may have up to four three bit binary channels. If all sixteen digital inputs were programmed to operate in the binary mode, the Drone could potentially accept up to 32,000 individual binary commands (fifteen bits plus a strobe).

FIG. 9B shows the Paralyze Command sub-block screen, which is an internal Drone algorithm used to manage input control. Based upon a particular command, the Drone may "paralyze" other selected digital or analog inputs. An operator may also program a paralyze command in the graphics mode by making a paralyze button and programming it into a digital input.

FIG. 9C shows a third sub-block screen representing digital input command control which is used to program commands for simplex mode digital inputs. Any given digital input may be associated with an almost unlimited number of commands. A programmer simply selects the command input, the destination system component, and the specific command to be sent upon the occurrence of a logic high or low condition. While this relates to a two-state command, switching between two discreet gain or attenuation levels is also allowed.

FIG. 9D shows an example of the Drone sub-block screen used to program commands for analog inputs. Programming is achieved by setting high and low ends of an analog command range. An example of an analog input command use is for controlling system gain at individual system components, or to modify mixing characteristics of Crown IQ mixers.

Rather than using control blocks and sub-blocks, an operator may program the Drone using graphic objects. A Drone container object represents a memory area in the Drone that holds all the commands that will be associated with a particular input. The Drone may be programmed so that a single input is linked to multiple commands. An example of this is where an external potentiometer ("pot") is sensed at an analog input of a Drone, whereby it turns levels up or down at one or more component input, output or firmware algorithm (algo). Another example is an on/off button ("button") which may be connected to the Drone by any one of its sixteen digital inputs to enable/disable certain system components or functions. Graphic pot or button objects are used to replicate these above referenced devices and are placed in Drone containers to control system components.

To illustrate the above described programming process, assume you have speakers in a room, and you want the occupant of the room to be able to control speaker volume within a prescribed range. First connect an external wall-mounted pot for manual control to an analog input of a Drone. Next, create a Drone container for the assigned analog input associated with the room pot, and make a pot object for each channel (1 and 2) of the amplifier driving the speakers. Define the maximum and minimum attenuation settings as operating parameters associated with the pot objects. After placing the programmed pots on the graphic plate, using a graphic computer display and a mouse, grab the pots and drag them into the Drone container and release them. The Drone is now programmed to automatically change the attenuation level of each channel as the sensed voltage associated with the wall-mounted pot changes. Scaling is established automatically according to how the operator programmed the pot objects for the amplifier.

Figure 10A:
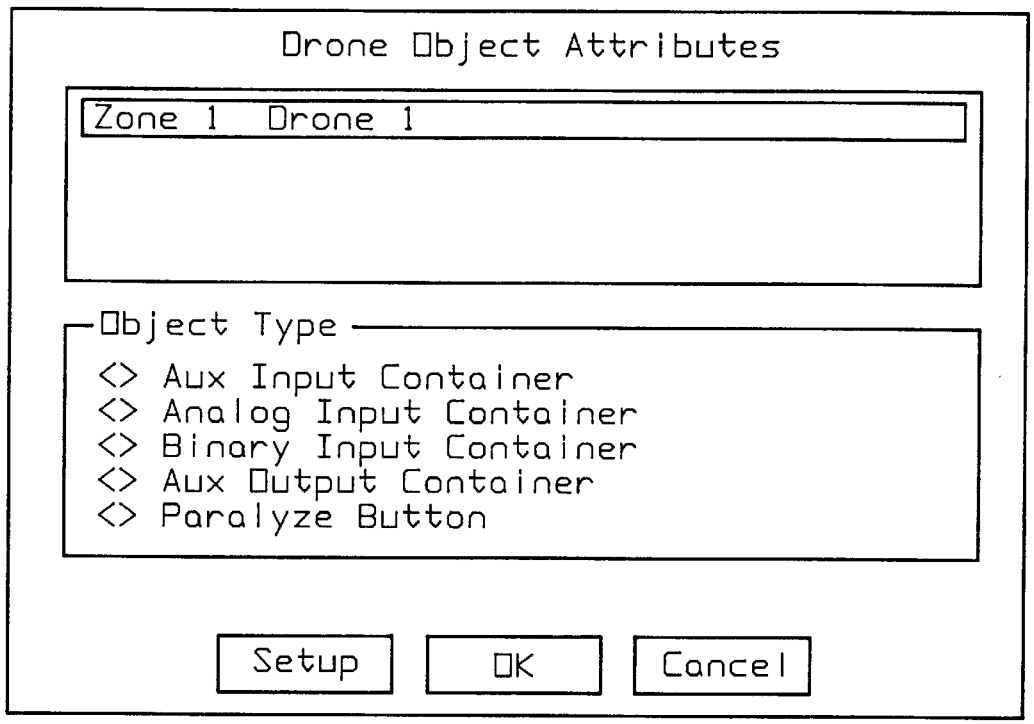
FIG. 10A is a screen print of a graphic object attribute screen used in programming dataframes for downloading to the Drone.
Figure 10B:
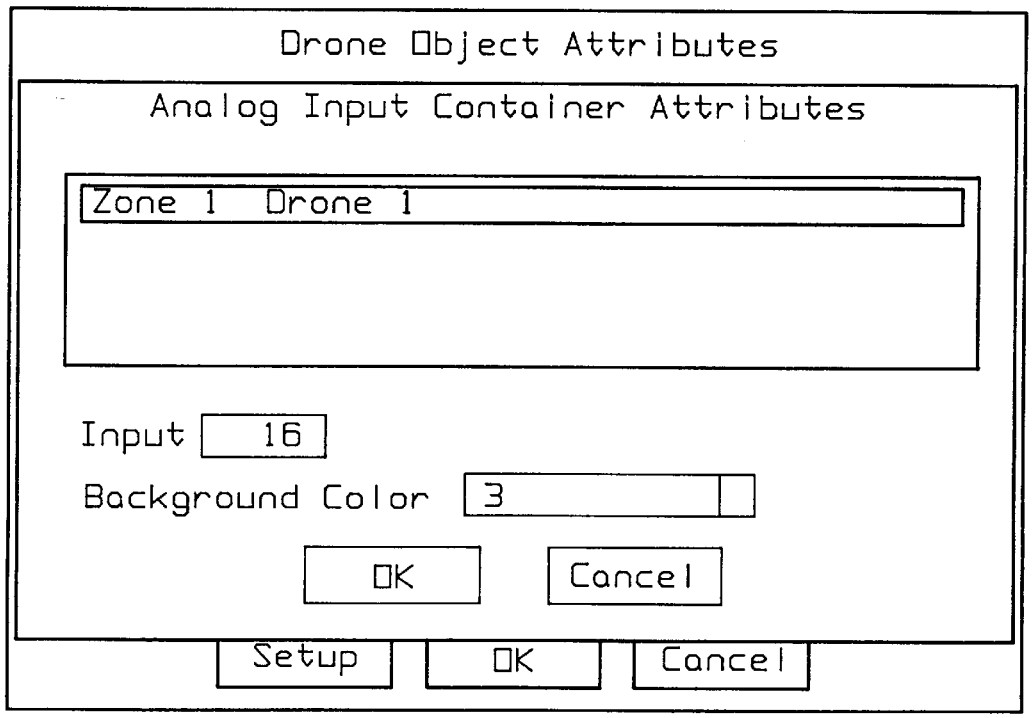
FIG. 10B is a screen print of a graphic object attribute screen used in programming dataframes for downloading to the Drone.

FIG. 10A and FIG. 10B demonstrate the Drone container attribute screens that an operator would utilize when programming Drone functions with graphic objects.

By using these Turbo plates, an operator may create and edit dataframes for downloading to the Drone's dual access RAM. A dataframe is a complete set of all instructions associated with a particular system application. A dataframe may be constructed for each application and specific mode of operation associated with a given system. For example, a system may comprise hundreds of system components, such as audio amplifiers, video cameras, microphones, switches, lights, relays, etc., which operate in some applications but not in others. In addition to application based enabling and disabling of system components, an operator may assign different component operating parameters for each given application.

Figure 6:
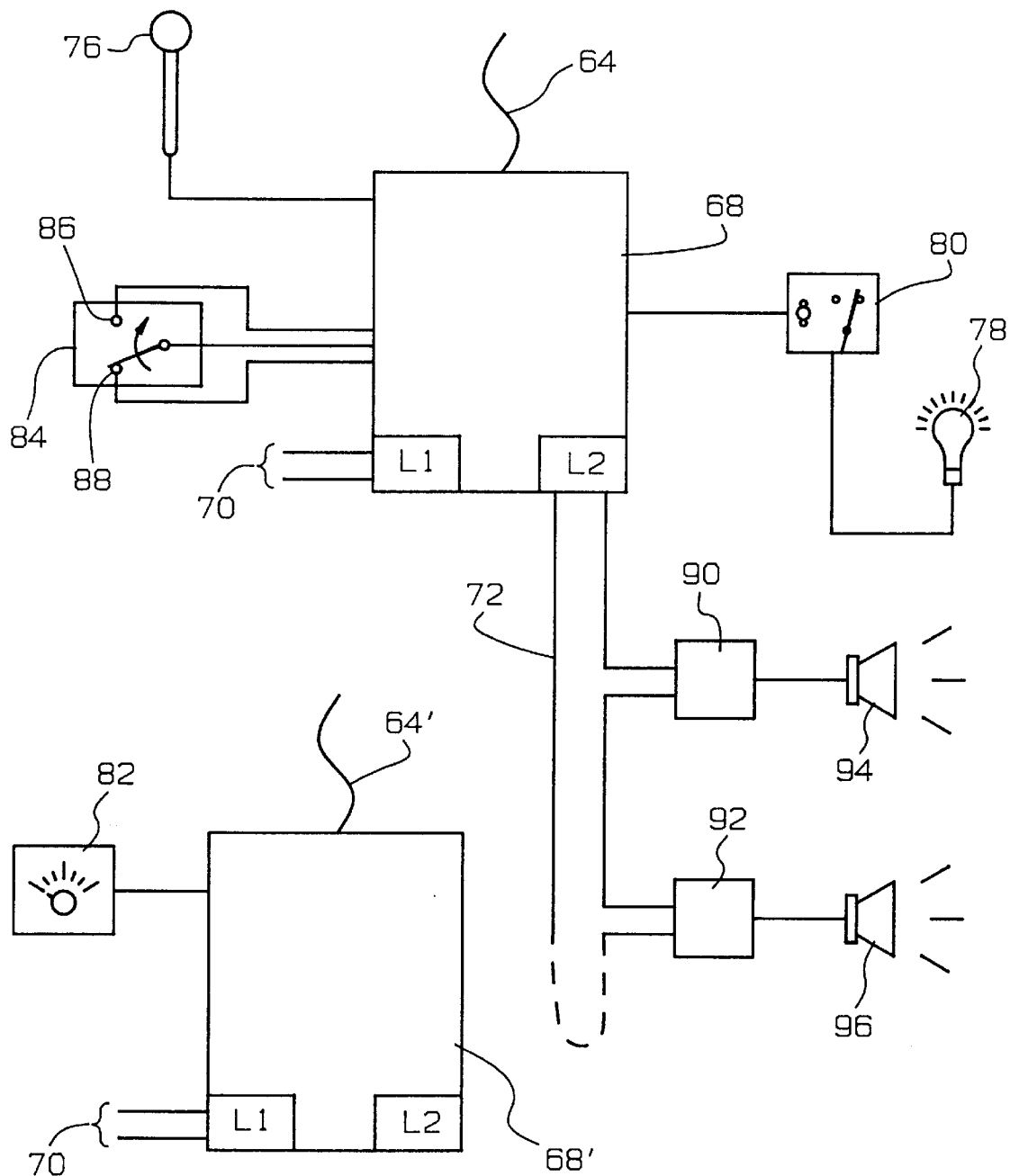
FIG. 6 is a block diagram of an audio application utilizing two Drones in communication with one another so as to allow information sensed by one to affect a system component of the other.

FIG. 6 illustrates a system as described above. Two dataframes have been downloaded into Drone 68, a "Home" mode dataframe and a "Party" mode dataframe. Switch 84 allows an operator to select the desired mode of operation. When placed in position 86, the Home mode dataframe is selected and implemented by Drone 68. In the Home mode, Drone 68 sends instructions via bus zone loop 72 to amplifier control module 90 which drives speakers 94. Drone 68 also sends a message instructing control module 92 to keep party speakers 96 in a de-energized state.

Drone 68' is interfaced with Drone 68 through a Crown INT interface unit (not shown) via communication lines 64, 64'. In an alternative configuration, Drone 68' could be connected to Drone 68 in transponder mode via bus zone loop 70. A wall-mounted pot is installed for manual manipulation of speaker volume in the effected space, and is connected to an analog input of Drone 68'. A pot object associated with the Home mode dataframe defines the operating parameters of the pot and controls the attenuation of speakers 94 accordingly.

With switch 84 placed in position 88, the Party mode dataframe is selected and implemented by Drone 68. In the Party mode, Drone 68 sends instructions via bus zone loop 72 to amplifier control module 92 which drives speakers 96. Drone 68 also sends a message instructing control module 90 to keep home mode speakers 94 in a de-energized state. The pot object associated with the wall-mounted pot connected to Drone 68' operates according to a different set of attenuation parameters to allow for higher speaker volume when in the party mode.

The system represented in FIG. 6 could also support a third dataframe downloaded into Drone 68 which could function as follows. Microphone 76 may be used to sense someone's presence in a room and for inputting an audio signal into Drone 68. When this occurs, the third dataframe takes priority of operation regardless of switch 84. In accordance with instructions associated with the third dataframe, Drone 68 sends a digital output to relay 80 which energizes light 78 so as to give notice to some third person of the presence of another in the sensed space. In addition, Drone 68 may pass an instruction via bus zone loop 72 to either control module 90, 92, or both so as to drive speakers 94, 96, or both. Microphone 76 could also be connected to Drone 68 with phantom power so as to directly drive an external device, such as headphones (not shown).

Figure 7:
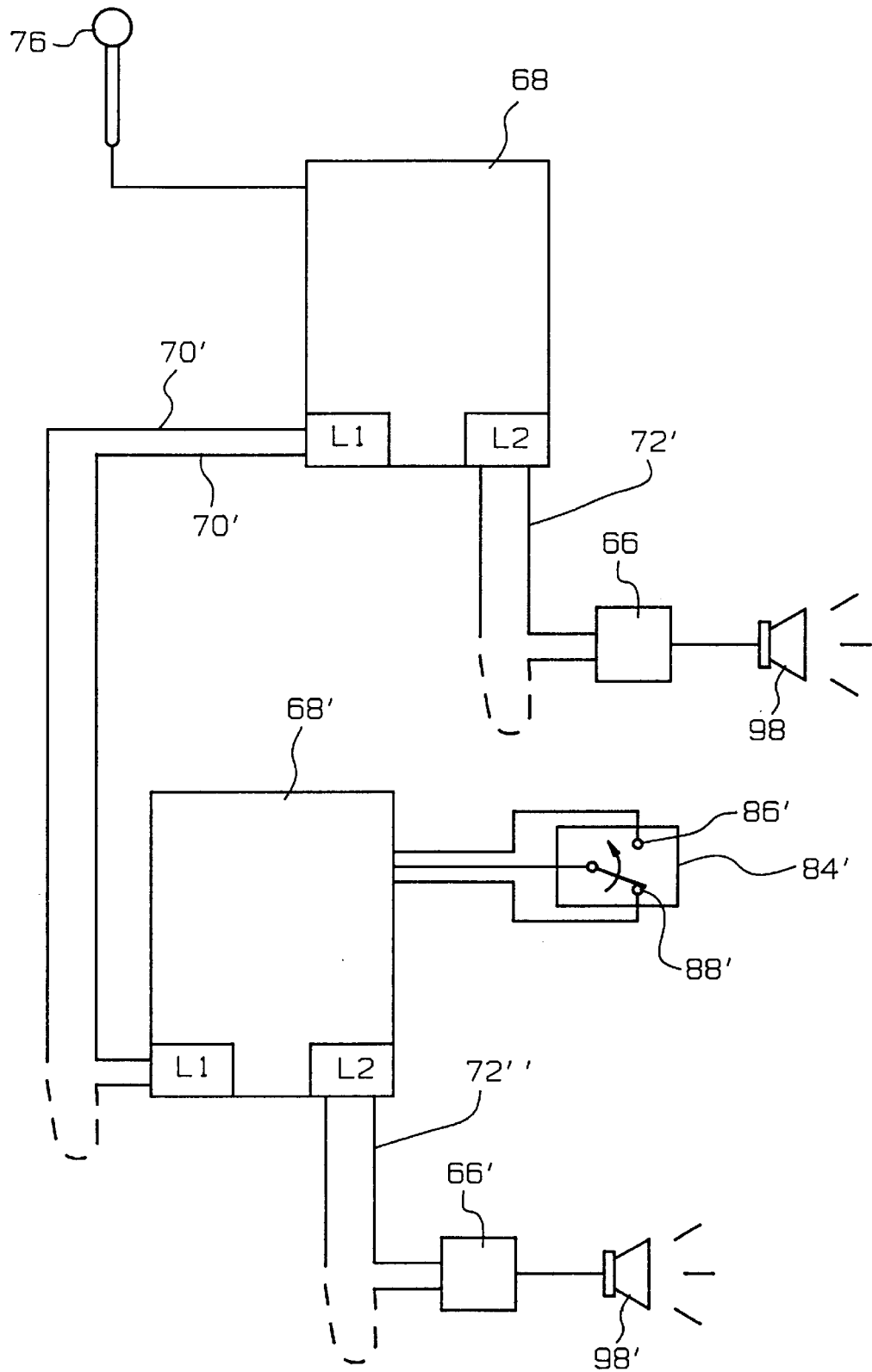
FIG. 7 is a block diagram of a theme park ride application utilizing two Drones in communication with one another in either the interface or transponder modes.

FIG. 7 shows two Drones 68, 68' connected in a transponder mode via bus zone loop 70', with each having a second bus zone loop 72', 72" for attaching system components 66, 66'. The following is a description of a dataframe downloaded into the Drone of FIG. 7 that could support numerous applications, such as an amusement park, a hotel lobby, convention area, etc. Microphone 76 can be placed in an area of public congregation so that as the number of people in the area increases, along with accompanying noise level, the analog input to Drone 68 increases. Drone 68 may then, in accordance with the associated dataframe, instruct control module 66 to raise the amplifier gain, thereby raising the volume of speaker 98.

The system of FIG. 7 allows an operator to select the dataframe residing in Drone 68, as described in the preceding paragraph, by placing switch 84' in position 88'. Provided the dataframe includes an amplifier object associated with control module 66', then the volume of speaker 98' may be increased in the same manner as described above with speaker 98.

While this invention has been described as having a preferred design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An apparatus for controlling a plurality of electronically controllable devices, said apparatus including:

first and second independent processor, each of said first and second independent processors including a set of instructions for generating and sending control signals to a plurality of electronically controllable devices, each of said processors including a plurality of inputs;

one memory accessible by both said first and second independent processors; and dataframe information stored in said memory, said dataframe information accessible by said first and second independent processors, said first and second independent processors generating and sending said control signals according to said dataframe information, at least one of said first and second processors being adapted to prioritize said dataframe information in accordance with a predetermined condition.

2. The apparatus of claim 1 wherein one of said first and second processor means includes communication means for receiving dataframe information and storing dataframe information into said memory.

3. The apparatus of claim 1 wherein one of said first and second processor means includes address means for storing a system address.

4. The apparatus of claim 1 wherein said dataframe information includes device definition information and operating instructions for said first and second processor means.

5. The apparatus of claim 1 wherein one of said first and second processor means includes a plurality of outputs for connecting to a plurality of electronically controllable devices.

6. The apparatus of claim 1 wherein one of said first and second processor means includes bus means for communicating with a plurality of electronically controllable devices.

7. The apparatus of claim 1 wherein one of said first and second processor means includes phantom power means for balancing a corresponding one of said plurality of inputs.

8. A method of operating a plurality of electronically controllable devices, said method comprising the steps of:

providing a drone for generating and sending control signals to the plurality of electronically controllable devices, the drone including two processors and a common memory, each processor including a set of instructions for generating and sending the control signals;

defining a plurality of dataframes on a computer, said dataframes including device definition information and operating instructions for the plurality of electronically controllable devices;

sending said dataframes from the computer to the drone; and operating the drone to send control signals to the plurality of electronically controllable devices according to said dataframes, the two processors being adapted to prioritize at least some of said dataframes in accordance with a predetermined condition.

9. The method of claim 8 wherein said defining step includes using an object oriented system and a graphic plate.

10. The method of claim 8 wherein said defining step includes using predetermined sub-blocks representing predefined device definition information.

11. The method of claim 8 wherein said sending step includes storing the dataframe in memory of the drone.

12. The method of claim 8 wherein said operating step includes separately controlling two networks, each of said networks including a plurality of electronically controllable devices.

13. The method of claim 8 wherein said operating step includes the drone transmitting control signals between a host computer and a network including a plurality of electronically controllable devices.

14. The method of claim 13 wherein said drone providing step includes providing a user override switch, and said operating step further includes said drone generating and sending control signals in response to an activation of said user override switch.

15. The method of claim 8 wherein said drone providing step includes providing a potentiometer attached to the drone, and said operating step includes the drone generating control signals according to the state of the potentiometer.

16. A system for controlling a plurality of electronically controllable devices, said system comprising:
   a computer including a display and data entry unit for allowing user input of dataframe information;
   a Drone including memory for storing said dataframe information, said Drone including two processors having access to said memory, each said processor including a set of instructions for generating and sending control signals for the electronically controllable devices according to said dataframe information, said two processors being adapted to prioritize said dataframe information in accordance with a predetermined condition.

17. The system of claim 16 wherein said Drone includes address means for storing a system address.

18. The system of claim 16 wherein said dataframe information includes device definition information and operating instructions for said Drone.

19. The system of claim 16 further comprising bus zone means for sending messages to said Drone and the plurality of electronically controllable devices and interface means for sending control instructions from said computer to said bus zone means, said bus zone means connecting said Drone and said interface means.

20. The system of claim 16 further comprising first and second bus zone means connected to said Drone, said first and second bus zone means for transmitting control signals from said Drone to the plurality of electronically controllable devices.

21. The system of claim 16 further comprising a second computer, a second Drone, a network connecting said computer and said second computer, a first bus zone means connecting said Drone and said second Drone, and a respective second bus zone means for transmitting control signals from a respective Drone to the plurality of electronically controllable devices.

* * * * *